April 21, 1953  T. R. SMITH  2,635,445
LIQUID LEVEL CONTROL MECHANISM FOR WASHING MACHINES
Filed April 23, 1949  4 Sheets-Sheet 1

INVENTOR.
Thomas R. Smith
BY
Wilkinson, Huxley, Byron & Hume
ATTORNEY.

April 21, 1953   T. R. SMITH   2,635,445
LIQUID LEVEL CONTROL MECHANISM FOR WASHING MACHINES
Filed April 23, 1949   4 Sheets-Sheet 2

INVENTOR.
Thomas R. Smith
BY
Wilkinson, Huxley, Byron & Hume
ATTORNEY.

April 21, 1953　　　　　T. R. SMITH　　　　　2,635,445
LIQUID LEVEL CONTROL MECHANISM FOR WASHING MACHINES
Filed April 23, 1949　　　　　　　　　　　　4 Sheets-Sheet 3

INVENTOR.
Thomas R. Smith
BY
Wilkinson, Huxley, Byron & Hume
ATTORNEY.

April 21, 1953  T. R. SMITH  2,635,445
LIQUID LEVEL CONTROL MECHANISM FOR WASHING MACHINES
Filed April 23, 1949  4 Sheets-Sheet 4

INVENTOR.
Thomas R. Smith
BY Wilkinson, Huxley, Byron & Knaus
ATTORNEY.

Patented Apr. 21, 1953

2,635,445

UNITED STATES PATENT OFFICE 2,635,445

LIQUID LEVEL CONTROL MECHANISM FOR WASHING MACHINES

Thomas R. Smith, Newton, Iowa, assignor to The Maytag Company, Newton, Iowa, a corporation of Delaware Application April 23, 1949, Serial No. 89,252

17 Claims. (Cl. 68—12)

This invention relates to liquid level control mechanism and more particularly to adjustable float devices for controlling the quantity of water or washing liquid delivered to a receptacle or tub in a washing machine.

Among the objects of the invention is to provide a float for an automatic washing machine which is adjustable so that smaller than normal amounts of fabrics may be washed in smaller than normal quantities of water.

In washing machines the receptacle or tub is designed to normally contain a predetermined quantity of washing liquid to effectively wash an optimum poundage or amount of clothing or fabrics depending upon the particular size of the receptacle. In the usual types of automatic washing machines the quantity of water admitted to the receptacle is under control of a liquid level responsive device responsive to the level of water in the receptacle or to the overflow therefrom to terminate the flow of water and, in most instances, to start the washing operation, or the flow of water to the receptacle may be controlled by a time controlled device of any suitable type. Under most operating conditions either method of control has been more or less satisfactory. However, there are times when the operator may not have available a sufficient amount of fabrics to be washed in order to justify the use of a relatively large quantity of hot water and detergent which, incidentally, are the main items of expense in washing. If an automatic type washing machine were put into operation under these conditions it is obvious a larger quantity of hot water and detergent would be used than is necessary to wash effectively, and any amount over that required by the smaller amount of fabrics would be wasted.

Therefore, by providing means whereby the float for controlling the flow of liquid to the receptacle may be adjusted at will, the quantity of water delivered to the receptacle may be varied, within the design limits of the float, and thereby provide a means for operating an automatic washing machine more economically under smaller than normal load conditions. When the normal amount of fabrics is being washed, in accordance with the design of the washing machine, the float would, of course, be moved to its full load position and would operate in the usual manner to admit the normal quantity of water.

It is therefore another object of the present invention to provide an adjustable float for an automatic washing machine to overcome the above mentioned disadvantages by providing a float member in an easily accessible place which may be utilized to vary the level of liquid in a washing receptacle in accordance with the amount of fabrics to be washed.

It is still another object of the invention to provide an adjustable float for an automatic washing machine which is disposed in a center support in the washing receptacle for controlling the liquid level therein.

It is another object of the invention to provide an adjustable float for controlling a washing operation which is carried by a washing device disposed in a rotatable washing receptacle that is readily accessible by the operator for adjustment.

Other objects, features, capabilities, and advantages are comprehended by the invention as will later appear and as are inherently possessed thereby.

Referring to the drawings.

Figure 1:
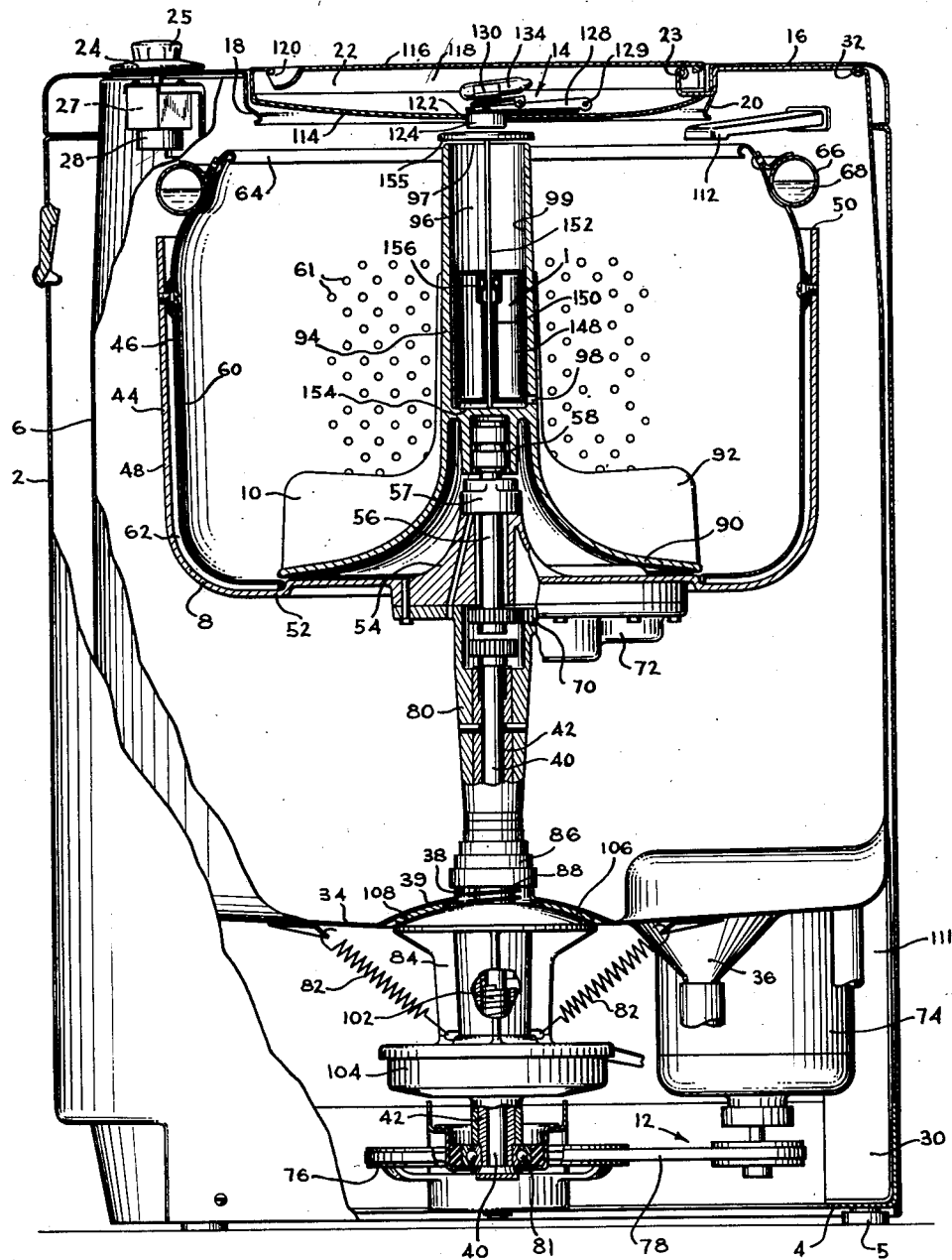
Figure 1 is a partial vertical cross-sectional view of a washing machine embodying an adjustable float mechanism made in accordance with the present invention.

Referring now more in detail to the drawings for one form of a combined washing and drying machine, embodying a control mechanism including an adjustable float 1 made in accordance with the present invention, there is shown an outer cabinet 2, secured to a base structure 4 having adjustable leg portions 5 for completely enclosing the operating parts of the machine.

The base 4 provides a support for an outer stationary tub 6, a support for an inner rotatable receptacle or tub 8, mounted for rotation about a vertical axis, having an agitator or washing device 10 disposed therein, as well as a support for mechanism, generally referred to as 12, for operating the agitator 10 and for rotating the tub 8 in a washing cycle, as will be hereinafter more fully disclosed. The washing machine further includes a control mechanism, generally referred to as 14, for automatically controlling certain operations in the washing cycle.

The cabinet 2 has its main body portion formed with side, front and back panels with a top or cover panel 16 secured thereto to provide a substantially rectangular unitary structure. The top panel 16 is preferably formed with an opening 18 defined by a downwardly and inwardly extending flange 20 to permit access to the inner rotatable tub 8 and is normally closed by a lid 22, hinged at 23 to the top panel 16 to pivot about a horizontal axis. In this instance, the top panel is further formed with two openings adjacent the front corners thereof, each of which has a control shaft 24 extending upwardly therethrough with a control knob 25 mounted thereon adapted to be grasped by the operator for manipulation. One of the control shafts is adapted to be adjusted for controlling a thermostatically operated mixing valve 26, and the other is adapted to be manipulated by the operator for manually positioning a plurality of cams 27 normally driven by a timer motor 28 for automatically controlling the washing cycle, as diagrammatically shown in Figure 8 of the drawings.

The outer stationary tub may be supported, in any suitable manner, by a plurality of corner posts 30 and is preferably formed circular in horizontal cross-section, with an upper open end 32 disposed adjacent the lower portion of the top panel 16 and a lower bottom portion 34 having a drain opening 36 and a centrally disposed enlarged opening 38 in the crown portion 39 through which vertical co-axial shaft means extend. The shaft means is in the form of a rotatable inner shaft 40 and an outer rotatable tubular shaft 42, for supporting and rotating the inner tub 8 and for actuating the agitator 10.

Disposed within and at the upper portion of the outer tub 6 and secured to the upper end of the outer tubular shaft 42 is the inner rotatable tub 8 which may be formed in two sections or parts 44 and 46, if desired, and is preferably circular in horizontal cross-section. The outer part 44 is preferably substantially imperforate and cup-shaped in vertical cross-section provided with a substantially vertically disposed side wall 48 open in the direction of the cover and terminating in the top edge 50 disposed above the normal liquid level desired for washing, and having a generally horizontal bottom wall 52 formed with a centrally disposed upwardly extending hub 54.

Projecting through and upwardly from the hub 54 is a vertically disposed oscillatable shaft 56 splined to a mating hub 58 on the agitator 10 for actuating or oscillating the same about a vertical axis to agitate the material and water therein. Any suitable sealing means 57 may be utilized between the hub 54 and the shaft 56 to provide a fluid-tight joint.

The inner part 46 of the rotatable receptacle is in the form of an open ended cylindrical basket having a lower portion 60 perforated with a plurality of relatively small openings 61 which is disposed in substantially parallel relation to the side wall 48 and bottom 52 of the outer imperforate part 44 to provide a small space 62 therebetween for free flow of the washing liquid out of the receptacle and over the top edge 50 when it is rotated. The basket 46 is secured to the outer part 44 in any suitable manner and its lower portion encompasses the hub 54 while the upper portion is imperforate and extends upwardly and inwardly above the top edge 50 terminating to define an opening 64 disposed in alignment with the opening 18 in the cover 16, whereby the operator may have access to the interior of the rotatable tub 8 when the lid 22 is opened.

In this particular construction the upper portion of the inner basket 46 has mounted thereon a hollow toroidal balancing member or ring 66 preferably containing a mobile material 68, of any suitable type, having a relatively high specific gravity, which serves as a balancing means for tending to maintain the rotatable receptacle 8 in its vertical position when it is rotated at relatively high speeds, above its critical speed, under unbalanced load conditions.

Means for oscillating the agitator 10 are provided by suitable mechanism generally indicated at 70 which, in this construction, is carried in a gear housing 72 bolted to the bottom of the rotatable tub 8 to increase the mass thereof. This oscillating mechanism is preferably directly operated by the inner vertically disposed rotatable shaft 40 which has a driven pulley 76 secured thereto, the same being continuously rotated in one direction by a motor 74, when energized, by means of a belt 78. The gear housing 72 is further provided with a downwardly projecting hub portion 80 concentric with the shaft means and rigidly secured to the upper end of the outer tubular shaft 42, while the lower end of the shaft means 40 and 42 are mounted in a combination radial and thrust bearing 81 adjacent the lowermost portion of the base 4.

The combined radial and thrust bearing 81 provides the sole support for the rotatable tub 8 which is free to tilt thereabout at which time the upper portion of the tub will move laterally with respect to the opening 18 in the top panel 16. Accordingly, means is provided to maintain the tub in a substantially vertical position during the washing operation and, although it is not absolutely necessary, it is desirable to have the means act to aid in centering the same when the receptacle is rotated. In this instance, a plurality of oppositely disposed, preferably four, centering springs 82, disposed at an angle to produce a component of force axially of the shaft means in addition to the centering action, are connected at one of their ends to the bottom 34 of the stationary tub 6 and the opposite ends are connected to a damper housing 84 disposed adjacent to and beneath the bottom 34 of the stationary tub 6. The damper housing is also disposed concentric with and journalled on the outer shaft 42 and moves laterally therewith.

Leakage between the outer hollow shaft 42 and the stationary tub 6 where the shaft means traverses the tub at the crowned opening 38 is prevented by means of a seal or boot 86 formed of resilient or flexible material, such as, for example, rubber or the like, which has its lower edge engaging an upstanding portion about the opening 38 in the stationary tub and its upper edge pressed into frictional engagement with the lower end of the hub 80 on the gear housing 72 by means of a spring 88 disposed about the hollow shaft to apply a longitudinal force thereto.

The agitator 10, disposed within the inner tub 8, is formed with a flaring base or body portion 90 extending downwardly and outwardly from the tub 58 to underlie the clothes, and has one or more blades 92 extending radially upwardly and outwardly from the upper portion of the base 90 adapted to agitate the liquid within the tub upon oscillation of the agitator for effecting the washing operation. The agitator is further provided with a central center post or pedestal 94 disposed on the vertical axis of the tub which extends upwardly from the hub 58 above the normal liquid level within the tub 8. This center post is formed with an inner chamber or compartment 96 defining a float chamber having an upper open end 97 facing in the direction of the lid 22 and communicating with the interior of the receptacle 8 through one or more openings 98 extending radially through the wall of the center post adjacent the bottom of the chamber. On the inner peripheral surface 99 of the chamber 96 there are provided a plurality of vertically disposed ribs 100 adapted to loosely position the float assembly within the chamber to permit the same to slide longitudinally therein with a minimum of friction in accordance with the liquid level within the receptacle and chamber 96 to operate the control mechanism 14, as will be hereinafter more fully described.

As previously mentioned, the material introduced into the receptacle is subjected to a washing action through the oscillating action of the agitator and is also subjected to a centrifuging action whereby the same is spin-dried upon rotation of the inner tub 8. In order to rapidly rotate the inner tub, suitable clutch mechanism 102 may be provided for effecting a driving relation between the inner shaft 40 and the outer shaft 42.

Means are provided in the form of a brake mechanism 104 secured in part to the stationary tub 6 and the outer shaft 42 for holding the receptacle 8 stationary during the washing operation and for permitting the rotation of the receptacle during the spinning operation. The operation of both the brake 104 and clutch 102 is under control of a solenoid 106 (Figure 8) which when deenergized applies the brake and renders the clutch inactive and when energized releases the brake and engages the clutch to connect the inner and outer shafts together to drive the same in unison.

The damper housing 84, which provides a support at least in part for the clutch and brake mechanisms and has the centering spings connected thereto, is also provided at its uppermost end with a spherical surface 106 having dampening material attached thereto which is positioned to engage the crown portion 39 of the stationary tub 6. This dampener is provided to reduce the amplitude of lateral movement of the receptacle 8 during the spinning operation.

A clutch, centering means, brake and dampener mechanisms suitable for effecting the above operation are described and claimed in my copending application, Serial No. 66,230, filed December 20, 1948, and assigned to the assignee of the present invention. It is to be understood, however, that said application discloses but one form of such mechanisms suitable for operating the washing machine as herein disclosed and that other suitable types may be utilized.

Hot or cold washing liquids or water are supplied from conduits 109 and 110 (Figure 8) to the thermostatically controlled mixing valve 26 which discharges the water at the proper temperature into a conduit 111 extending upwardly between the cabinet and outer tub 6, the same being connected at its upper end to an inlet spout 112 extending laterally through an opening in the upper part of the tub 6 to discharge the washing water into the rotatable receptacle 8.

In the washing machine as herein disclosed, the lid 14 for the cabinet is formed with a base section 114 and a cover section 116 having abutting outer edges and the two sections are secured to form a unitary structure to provide a chamber or compartment 118 for a plurality of switch assemblies or devices constituting a part of the control mechanism 14. The top wall or cover section 116 is preferably formed adjacent the front, and remote from the hinge 23, with a recess to provide a handle or grip device 120 which can be readily grasped by the operator to swing the lid into and out of its closed position. It is to be understood that the two sections may be readily separated to permit access to the compartment 118 formed by these wall sections for repairing, adjusting or replacing any of the switch control devices or any part thereof mounted therein. The base or lower wall section 114 is provided with an aperture 122 disposed directly above and preferably in alignment with the open end 97 in the top of the center post 94 and through which a control button 124 of the control mechanism 14 loosely projects for a purpose to be described.

Figures 2, 3:
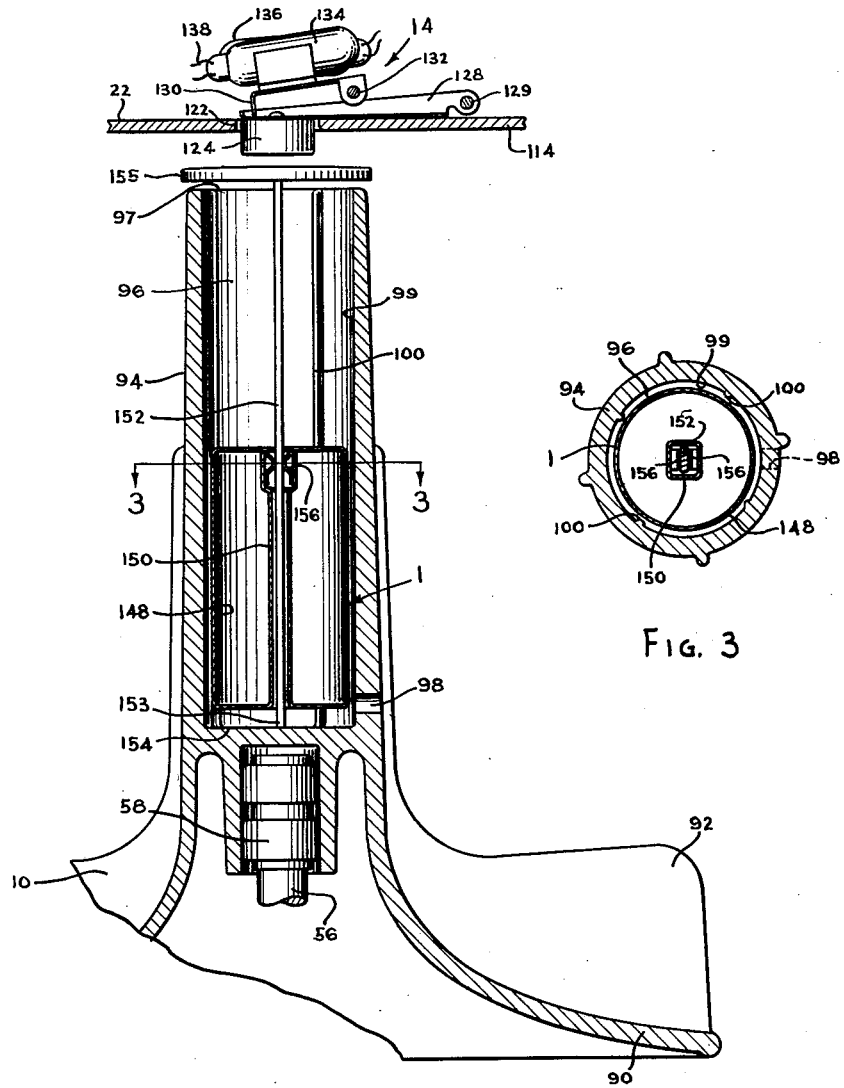
Figure 2 is an enlarged partial vertical cross-sectional view of the float and lid construction shown in Figure 1 of the drawings disclosing more in detail the mechanism incorporated therein.
Figure 3 is a horizontal cross-sectional view taken in the plane represented by line 3—3 of Figure 2 showing the float and center post construction.

This control button 124 is secured adjacent one end of a lever 128 which is pivoted at its opposite end 129 to a pin carried by the lower wall section 114. A bracket 130 is pivotally mounted above the lever 128 on a pivot 132 and provides a support for a pair of control switches 134 and 136 of the mercury type whose longitudinal axes are displaced with respect to each other. This bracket is movable about its pivot point 132 by the lever 128 when the same is moved by the float assembly 1. The mercury switches 134 and 136 are mounted with their longitudinal axes angularly disposed with respect to one another and have their contacts 138 and 140 oppositely disposed, as more clearly shown in Figure 8 of the drawings. As shown in Figures 1 and 2, the button 124 is in its lowermost position, indicating that the receptacle 8 is empty or that the liquid is at such a low level as to be ineffective to raise the float.

Figure 8:
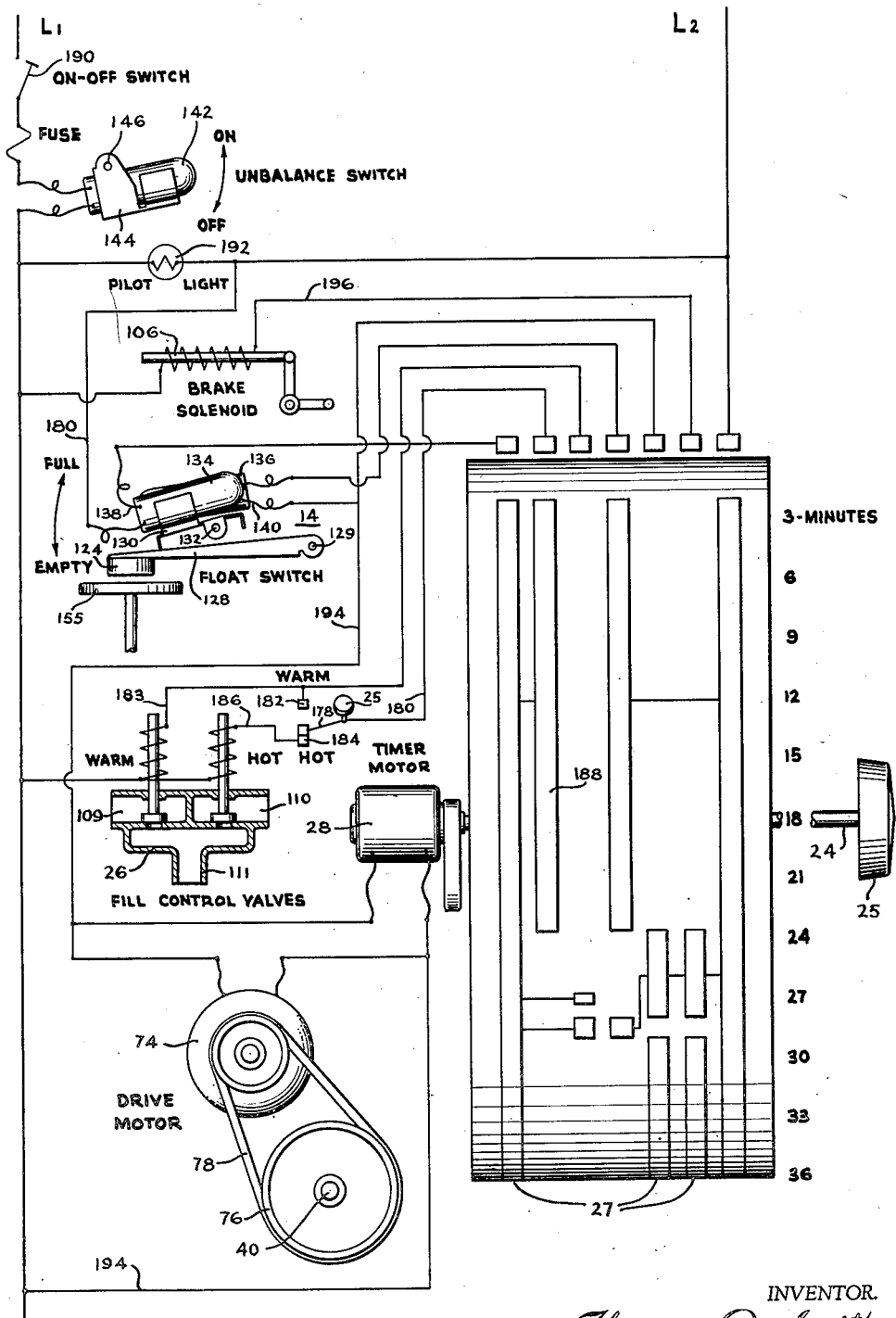

Under such circumstances, the contacts 138 of the switch 134 are bridged by the mercury contained therein, whereas the contacts 140 are not bridged by the mercury in the other switch 136 which at that time is disposed at the opposite end of the switch. However, upon the level of the washing liquid reaching a predetermined level in the tub the button 124 is engaged by the upper portion of the float assembly 1 and it is raised upwardly causing the bracket 130 to pivot about its pivot 132 to the position whereby the mercury in the switch 134 is moved to the end opposite the contacts 138 to render it inoperative to interrupt the flow of water to the tub, and the mercury within the other switch 136 is moved to bridge the contacts 140 and to energize the timer motor 28 and the main driving motor 74. The results accomplished by angularly disposing the switches with respect to each other and the operation of the switches in the control circuit is shown in Figure 8 and will be more fully described hereinafter.

Although forming no part of this invention, there is provided a safety lid shut-off and unbalance switch 142 (Figure 8) mounted on a bracket 144 for pivotal movement about a pivot pin 146 with a portion (not shown) extending downwardly through an opening in the base section 114 of the lid in spaced relation to the center post. The switch 142 is included in the main line circuit $L_1$—$L_2$ and when moved to its tripped position, due to an uneven distribution of fabrics which causes the tub to wobble or gyrate laterally an excessive amount from its normal vertical position or if the lid should be raised by the operator, it renders the entire electric circuit inoperative to stop the washing machine regardless of the position of the control cams 27.

The details of construction of the entire switch assembly 14 and the unbalance switch 142 and the operation thereof in an apparatus of the type herein disclosed is more fully described in the co-pending application of Thomas R. Smith and Dudley P. Combs, Serial No. 64,792, filed December 11, 1948, now Patent No. 2,612,766, issued October 7, 1952, and assigned to the assignee of the present invention.

Referring now more particularly to Figures 1, 2 and 3 for a disclosure of the details of construction of one form of an adjustable float assembly adapted to be disposed in the float chamber in the upper portion of the center post 94 of the agitator, there is shown a hollow metallic cylindrical sealed container or buoyant device 148, having a relatively high buoyancy, loosely mounted for vertical movement in the float chamber and being capable of adjustment to various positions therein. The float is further provided with a centrally disposed opening 150 through which a shaft or flat rod 152 extends, the bottom end 153 of which is adapted to rest on or be supported by the bottom or lower portion 154 of the chamber 96. Mounted upon and carried by the upper end of the shaft or rod 152 is an enlarged substantially spherical shaped abutment 155 disposed below the control button 124. This enlarged abutment preferably extends slightly beyond the upper open end of the center post and covers the same to improve its appearance and also to insure contact with the button 124 should the receptacle be displaced from its vertical position for any reason during the water filling operation, when the float is elevated by the liquid in the chamber. The disposition of the periphery of the abutment is such as to provide means for an operator to readily grasp the same to remove the float from the chamber for adjustment.

Disposed within the container is a pair of spring friction members 156 of any suitable type having one of their ends secured to the container about the central opening 150 and the other ends projecting toward each other adapted to grip the rod 152 therebetween with sufficient force to hold the same in the position selected by the operator, yet capable of relatively easy adjustment when desired. If desired, a portion of one surface of the rod 152 may be marked, in any suitable manner, so that the operator may readily adjust the same to full, three-quarter, one-half load, etc., whichever is desired.

Thus, if the operator is washing a full load of clothing all that need be done is to remove the float member from the chamber and adjust the container 148 to the desired position or location on the bar 152 and replace the same, after which the lid 22 is closed and the machine started in operation. When the liquid flowing through the opening 98 into the chamber 96 reaches the desired level the abutment on the float will actuate the button 124 to interrupt the flow of water flowing through the inlet 112 to the receptacle 8 and to energize the timer motor 28 to start the washing operation. Likewise, if the operator has less than a normal amount of fabrics to be washed she need only estimate the weight or size of the load and move the container 148 of the float assembly to the corresponding position as indicated on the bar and thereafter the switches and control mechanism are operated in accordance with the new setting at the selected water level.

Figure 5:
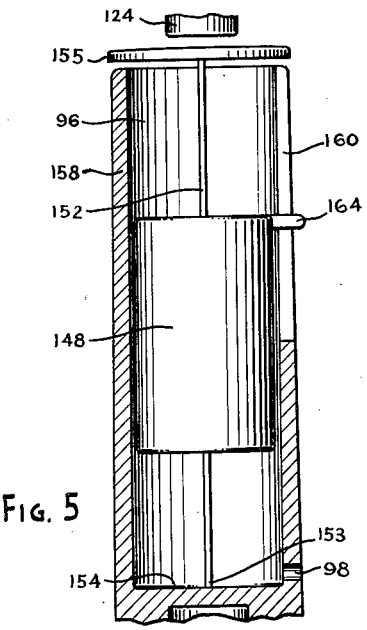
Figure 5 is a vertical-sectional view taken in the plane represented by line 5—5 of Figure 4 of the drawings.
Figure 4:
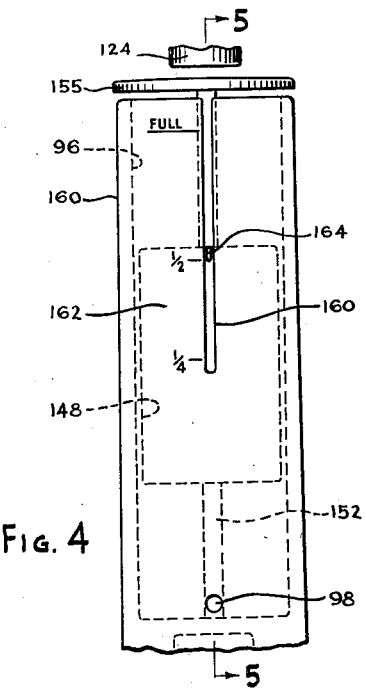
Figure 4 is a front elevational view of a modified form of adjustable float construction.

Referring now to the modification as shown in Figures 4 and 5, the upper portion of the agitator or center post 158 has been modified to the extent that it is provided with a longitudinal slot 160 in the wall thereof extending between the float chamber 96 and the receptacle 8. The hollow float container 148, abutment 155, rod 152 and friction grip means 156 are structurally the same as in the embodiment disclosed in Figure 1 and the container is supported by the rod in the same manner and performs the same identical operation as in said embodiment. However, in this modified form of the invention the indicia for locating or positioning the float is marked on the outer surface 162 of the center post 158 adjacent the slotted opening 160 so that the operator need not withdraw the float from the float chamber 96 to adjust its relative position for varying amounts of fabrics, but need only press down on the upper portion of the abutment 155 and grasp the end of an arm 164 rigidly secured to the upper portion of the float container 148 and projecting outwardly through the elongated slot 160 slightly past the outer periphery of the center support to move the same vertically to the desired position. It will be apparent form the above description that as the arm is moved the container is likewise shifted vertically on the rod 152 a corresponding amount.

In both of the preceding modifications the relative position of the abutment 155 and button 124 is fixed when the receptacle is empty because the lower end of the rod 152 normally rests on the bottom 154 of the float chamber when the tub is empty, and the hollow container 148 is shifted vertically or moved relative to the abutment to provide for operation of the washing machine at varying liquid levels.

Figure 7:
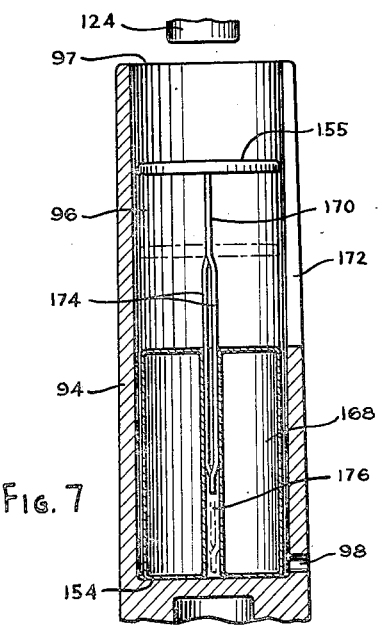
Figure 7 is a vertical-sectional view taken in the plane represented by line 7—7 of Figure 6 of the drawings; and, Figure 8 is a diagrammatic view of a control circuit for an automatic washing machine incorporating an adjustable float mechanism made in accord with the invention.
Figure 6:
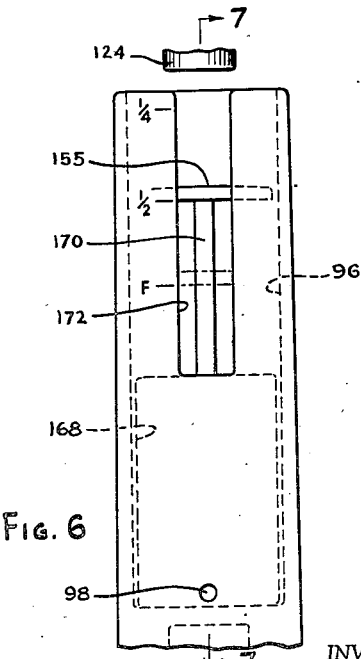
Figure 6 is a front elevational view of a further modified adjustable float construction.

The modification shown in Figures 6 and 7 is somewhat different in that the hollow container 168 normally rests on the bottom 154 of the float chamber 96 in the center post 169 when not in operation, the rod 170 carrying the abutment 155 is shortened and the outer diameter of the abutment is reduced so that it is capable of entering the upper open end 97 of the float chamber to change its relative position with respect to the button 124. An enlarged elongated slot 172 is provided in the wall of the center post which extends from the top thereof downward to approximately adjacent the upper surface of the hollow container 168 and is of such width as to permit the operator to insert a finger therethrough to hold the container against the bottom of the float chamber.

The upper end of the rod 170 is secured to the abutment 155 and a major portion of its lower end is split to provide a pair of spring friction members 174 which are slidably received in a centrally disposed opening 176 extending through the central portion of the container. The frictional force is of such a value as to prevent the relative position between the abutment and container from changing after it has been manually adjusted.

The indicia is marked on the outer peripheral portion of the center support of the agitator, but due to the change in the relative position of the abutment 155 on the float with respect to the button 124 the indicia is reversed. If the float has been positioned for a light load and it is desired to operate the next wash with a full load, the operator need only press upon the top of the abutment 155 until it is in alignment with or adjacent to the full load marking on the center post of the agitator and thereafter the washing operation will be started when the water reaches its selected level in the manner previously described. Also, if the float is set at full load the operator need only place a finger on the top of the container 168 and then lift up on the underneath side of the abutment and move the same upwardly until it is adjacent the mark indicating the desired load.

In the modifications shown in Figures 4 to 7 inclusive it is obvious that the position at which the float becomes active to operate the control circuit may be changed without removing the same from the float chamber.

Although the float has been described as being a hollow metallic container it is to be understood that any suitable buoyant means may be provided. Also, the particular friction means may also be modified to any suitable means for holding the relative position after the float has been adjusted to its desired position.

The operation of an automatic washing machine of the type hereinabove described and incorporating an adjustable float assembly made in accordance with the invention is as follows:

The operator determines if the amount of clothes or fabrics to be washed is equivalent to a full load or somewhat less, lifts the lid 22 and then either removes the float, or pushes or pulls the abutment to adjust or position the hollow container 148 on the bar 152 to the position corresponding to the amount or weight of the material to be washed. The material to be washed is then placed in the basket of the rotatable receptacle 8 through the opening 18 in the top cover, including with it the proper quantity of detergent, and the lid is closed. Thereupon the operator decides whether to use hot or warm water for the washing operation and adjusts the water temperature control knob to position movable contact 178 in an electrical circuit 180 to either engage a warm water contact 182 in a circuit 183 to energize the warm water valve, or to engage a hot water contact 184 to energize the hot water valve through a parallel circuit 186, when the appropriate timer cam 188 is advanced to complete the circuit 180 from $L_1$—$L_2$. For example, if the operator desires to use hot water, the contact 178 is moved into engagement with the hot water contact 184 and the circuit 186 is conditioned for operation.

Next, the operator grasps the timer control knob 25 and turns the same to the desired washing period and closes the main line switch 190 which conditions the timer motor 28 for operation and lights the pilot light 192 to indicate that the washing machine circuit is energized. Upon turning of the timer control knob, the hot water side of the thermostatically controlled valve 26 is actuated and conducts water at the proper temperature to the receptacle through inlet spout 112. As the water in the tub reaches the level of the opening 98 in the center post 94 of the agitator, water will flow therethrough into the float chamber 96 and further increase in the water level in the tub will eventually cause the float to be raised from its inactive position. After the float has been raised vertically a sufficient distance the abutment 155 carried on the upper end of the rod 152 contacts the button 124 on the lever 128 and raises the same about its pivot 129 which in turn tilts the bracket 130 about its pivot 132 to tilt the pair of mercury switches 134 and 136. When the liquid reaches a predetermined level, determined by the setting of the float, the mercury switch 136 is actuated to energize the timer motor 28 and main drive motor 74 through circuit 194 and the appropriate cams 27 to start the washing operation by oscillating the agitator 10 through the oscillating mechanism 70 and to advance the cams 27 on the timer. Shortly thereafter the switches 134 and 136 are tilted still further by an increase in the water level and the switch 134 deenergizes the water supply circuit and the flow of water to the receptacle through the valve 26 is interrupted, at which time the proper quantity of water for the washing operation has been introduced into the tub 8.

After a predetermined period of agitation in the washing cycle, the timer, through its advancing cams 27, completes a circuit 196 which energizes the brake solenoid 106 to release the brake 104 holding the receptacle 8 from rotary movement and at the same time causes the clutch 102 to be engaged to directly connect the continuously rotated drive shaft 40 to the hollow rotatable shaft 42 to rotate the tub 8 carried thereby, at which time no relative movement takes place between the agitator and tub. Also, the two mercury switches 134 and 136 are cut out of the control circuits by means of the cams 27 of the timer which control the same.

As the tub 8 is accelerated by the drive motor 74, water is discharged from the same over its top edge 50 and from the float chamber through its opening 98 and open top 97, and at full speed of rotation a major portion of the washing liquid is removed from the materials in the tub. During this time a flush rinse of clean, warm water is admitted to the receptacle through the inlet spout 112 by actuation of the cam controlling the warm water to complete the circuit 184 through the warm water control valve to remove a portion of the remaining soapy water in the materials.

As the timer motor reaches the end of the spin period the cam for energizing the same is moved to deenergize the timer motor 28 and drive motor 74 and deenergize the brake solenoid 106 so that it is actuated to apply the brake and release the clutch to stop and hold the tub 8 stationary. Simultaneously with this action the warm water valve is energized again by its cam through its circuit 184 and warm water is admitted to the tub 8, and upon attaining the proper liquid level therein, as determined by the operator in initially adjusting the float 148 for the wash water, the switches 134 and 136 are tilted in a manner similar to that previously described to again energize the timer and drive motors and to interrupt the supply of liquid to the receptacle and to initiate the agitate rinse period.

The operation of the washing machine during the agitating rinse period is identical to the operation thereof during the initial washing period, except that it is of shorter duration, after which the cams 27 are advanced to interrupt the agitating rinse period and the tub is again rotated as above described to remove the rinse water from the materials being washed and to discharge the same through the drain opening 36.

At the end of the final spin period, as determined by the location of the cams on the timer, the timer motor is deenergized simultaneously with the drive motor, the brake solenoid is deenergized to re-apply the brake to the tub to stop the same. During this washing cycle the fabrics have been washed with detergent, rinsed with clear water and have had a large portion of the water removed therefrom. The washing cycle is now completed and the operator need only raise the lid and remove the fabrics from the tub. Should the next batch of clothing or other material require more or less washing water the operator merely adjusts the float to the proper position and the washing cycle will be repeated in a like manner.

From the foregoing it can be seen that I have provided an adjustable float for an automatic washing machine which may be readily moved to accommodate varying amounts or weights of fabrics by using proportionately smaller or larger quantities of water to thereby provide for a more economical operation thereof when less than the normal amount of clothes is to be washed.

While I have herein described and upon the drawings shown illustrative embodiments of the invention, it is to be understood that the invention is not limited thereto but may comprehend other constructions, arrangements of parts, details and features without departing from the spirit thereof.

It is claimed:

1. In a washing machine, the combination of a tub adapted to receive liquid and material to be washed, a center support mounted within said tub, float means mounted for relative movement with respect to said center support and operated by the liquid in said tub, means for selectively adjusting said float means for operation when the liquid in said tub is at various predetermined levels, and control means for said washing machine operable by said float means when a predetermined liquid level has been reached in said tub corresponding with the selected adjustment of said float means.

2. In a washing machine, the combination of a tub adapted to receive liquid and material to be washed, a lid for said tub, a center support mounted within said tub, float means mounted for relative movement with respect to said center support and operated by the liquid in said tub, means for selectively adjusting said float means for operation when the liquid in said tub is at various predetermined levels, and control means for said washing machine having means carried by said lid operable by said float means when a predetermined liquid level has been reached in said tub corresponding with the selected adjustment of said float means.

3. In a washing machine, the combination of a tub adapted to receive liquid and material to be washed, a center support mounted within said tub, adjustable float means carried by said support for relative movement with respect thereto and operated by the liquid in said tub, and means operable by said float means when a predetermined liquid level has been reached in said tub corresponding to the adjustment of said float means for initiating the operation of said washing machine.

4. In a washing machine, the combination of a tub adapted to receive liquid and material to be washed, means for supplying a liquid to said tub, a center support mounted within said tub, adjustable float means carried by said support for relative movement with respect thereto and operated by the liquid in said tub, and means operable by said float means when a predetermined liquid level has been reached in said tub corresponding to the adjustment of said float means for initiating the operation of said washing machine and for shutting off said liquid supply means.

5. In a washing machine, the combination of a tub adapted to receive liquid and material to be washed, a lid for said tub, means for supplying a liquid to said tub, a center support mounted within said tub, adjustable float means carried by said support for relative movement with respect thereto and operated by the liquid in said tub, and control means for said washing machine having means carried by said lid operable by said float means when a predetermined liquid level has been reached in said tub corresponding to the adjustment of said float means for initiating the operation of said washing machine and for shutting off said liquid supply means.

6. In a washing machine, the combination of a tub adapted to receive liquid and material to be washed, a washing device disposed in said tub provided with a hollow upstanding center post, an adjustable float disposed within said center post and responsive to the level of liquid in said tub, and control means for said washing machine actuated by said float when the level of liquid reaches a predetermined value dependent upon the adjustment of said float.

7. In a washing machine, the combination of a tub adapted to receive liquid and material to be washed, a center post mounted within said tub and having a float chamber provided with a passage for communicating with said tub, control means for said washing machine including switch means provided with an actuating portion projecting over said center post, a float disposed within said float chamber responsive to the level of liquid therein for operation of said switch means, and means for rendering said float responsive to operate said actuating portion at varying liquid levels in said tub.

8. In a washing machine, the combination of a tub adapted to receive liquid and material to be washed, a center post mounted within said tub, said center post having a chamber formed in the upper portion thereof provided with an upper open end and a passage therethrough for communication with said tub, means for supplying liquid to said tub, valve means for controlling said supply means, switch means for controlling the operation of said valve means having an actuating portion projecting over said center post, a float disposed in said float chamber responsive to the level of liquid therein for contacting and moving said actuating portion of said switch means to interrupt the flow of liquid to said tub, and means for causing said float in said chamber to respond at varying liquid levels in said tub.

9. In a washing machine, the combination of a rotatable receptacle adapted to receive liquid and material to be washed, a washing device in said receptacle having a hollow upstanding center post open at its upper end to provide a float chamber and being provided with an opening therethrough in communication with the interior of said receptacle, a lid for said receptacle, switch means carried by said lid, means for supplying a liquid to said receptacle, drive means for selectively operating said washing device and for rotating said receptacle, means for connecting said switch means to said liquid supply and drive means to control the operation of the same, and an adjustable float assembly disposed in said float chamber responsive to predetermined liquid levels in said receptacle for operating said switch means to start the operation of said washing device and for interrupting the flow of liquid to said receptacle.

10. In a washing machine, the combination of a rotatable receptacle adapted to receive liquid and fabrics to be washed, a washing device having a part underlying the fabrics to be washed and being provided with a hollow center post having an upper open end disposed substantially centrally of said receptacle to define a float chamber provided with an opening therethrough adjacent the lower portion thereof in communication with the interior of said receptacle, drive means for actuating said washing device and for rotating said receptacle, means for supplying liquid to said receptacle including electrically controlled valve means, a lid for said receptacle, switch means carried by said lid for controlling the operation of said valve means and said drive means, an adjustable float mechanism disposed within said chamber having an abutment projecting toward said switch means and adapted to actuate the same when the level of liquid in said chamber reaches a predetermined level to cause operation of the washing device and to interrupt the flow of liquid to said receptacle, and means on said float mechanism for varying the relative position of said float with respect to said switch whereby the level of the liquid at which the switch is actuated may be varied in accordance with the quantity of fabrics to be washed.

11. In a washing machine, the combination of a rotatable receptacle adapted to receive liquid and fabrics to be washed, said receptacle being provided with a substantially imperforate side wall having a discharge edge above the normal desired liquid level, an oscillatable agitator having a part underlying the fabrics to be washed and an upstanding hollow center post to provide a float chamber with an opening in communication with the receptacle, drive means for oscillating said agitator and for rotating said receptacle, means for supplying liquid to said receptacle including electrically operated valve means, a lid for said receptacle movable to opened and closed positions, switch means carried by said lid for controlling the operation of said valve means and driving means, said switch means having a portion thereof projecting from said lid and being disposed over said float chamber when the lid is in its closed position, an adjustable float mechanism comprising a vertically disposed elongated member having one end thereof resting on the bottom of said float chamber and having an abutment secured to the other end thereof disposed above said float chamber beneath the projecting portion of said switch means, a buoyant member carried on said elongated member within said chamber and being movable in accordance with predetermined liquid levels within said receptacle for contacting said projecting portion for actuating the switch means to interrupt the flow of liquid to said receptacle and for energizing said drive means, and means for adjustably positioning said buoyant member with respect to said elongated member to render said buoyant member responsive to operate said switch means at varying liquid levels determined by the quantity of fabrics to be washed, and means for indicating the adjustment of said float mechanism.

12. In a washing machine, the combination of a rotatable receptacle adapted to receive varying quantities of washing liquid and materials to be washed, a washing device in said receptacle, means for supplying washing liquid to said receptacle, a chamber in communication with and disposed substantially in said receptacle, a switch for controlling said liquid supply means, switch actuating means disposed above said chamber, a float device operably positioned with respect to said chamber and movable to operate said switch actuating means, and means for adjusting said float device to render the same responsive to various liquid levels in said receptacle to control the quantity of washing liquid introduced into said receptacle in accordance with the amount of material to be washed.

13. In a washing machine, the combination of a rotatable receptacle adapted to receive varying quantities of washing liquid and materials to be washed, a washing device in said receptacle, means for supplying washing liquid to said receptacle, a chamber in communication with and disposed substantially centrally in said receptacle, a switch for controlling said liquid supply means, switch actuating means disposed above said float chamber, an adjustable float disposed in said chamber for actuating said switch actuating means to interrupt the flow of liquid to the receptacle, said float being provided with an abutment for contacting said switch actuating means, means for varying the position of said float with respect to said switch actuating means, and an indicator for indicating the position at which said switch will be actuated for varying quantities of liquid admitted to said receptacle in accordance with variable amounts of material to be washed.

14. In a washing machine, the combination of a rotatable receptacle having an upper open end adapted to receive varying quantities of washing liquid and fabrics to be washed and mounted for rotation about its vertical axis and for lateral movement about a pivot point remote from said receptacle, a washing device in said receptacle mounted for movement about the vertical axis of said receptacle and having a portion underlying the fabrics and a hollow center post extending above the liquid level, said center post being provided with a float chamber having an opening therethrough in communication with said receptacle and an upper open end, means for supplying liquid to said receptacle, a lid for covering said receptacle, switch means disposed in said lid for controlling said supply means and the operation of said washing device and having a portion projecting downward from said lid directly above said float chamber, an adjustable float disposed in said chamber responsive to the level of liquid therein and in said receptacle for actuating said switch means for interrupting the supply of water to said receptacle and for starting the washing operation, said float comprising a buoyant member mounted for vertical movement and having a passage located substantially centrally therethrough, an elongated member extending through both ends of said passage, said elongated member having its lower end in engagement with the bottom of said float chamber and carrying an enlarged abutment outside of said chamber at its upper end, said abutment being disposed below the projecting portion of said switch means and adapted to contact the same when said buoyant member is elevated by the level of liquid to interrupt the flow of liquid to said receptacle and cause actuation of said washing device, and means carried by said float for indicating the liquid level at which said buoyant member is effective to cause actuation of said switch means.

15. A liquid level control for a washing machine, comprising an imperforate tub having an opening at the top thereof above the normal desired liquid level for said tub, an oscillatable washing device in said tub having a hollow center post projecting above the normal liquid level, a lid disposed above said tub, means including valve means for supplying liquid to said tub, switch means carried by said lid for controlling the operation of said valve means and having a portion projecting from said lid over said center post, an adjustable float disposed in the hollow portion of said center post for actuating said switch means, said float comprising a hollow cylindrical buoyant member, a vertical rod extending through and beyond both ends of said member and normally having its lower end resting on the bottom of said chamber, frictional means carried by said member for securing the same adjacent the lower end of said rod to permit said member to be manually adjusted longitudinally thereon to vary the position of said member with respect to said lower end, and an enlarged abutment secured to the upper end of said rod remote from said buoyant member and extending beyond the upper end of said center post into operative association with the projecting portion of said switch for operation thereof.

16. An adjustable float assembly for controlling the level of liquid in a washing machine, comprising a cylindrical buoyant member, a rod extending through and beyond both ends of said member and having indicia thereon, frictional means carried by and within said member for securing the same to said rod adjacent one end thereof to permit manual adjustment longitudinally thereon to vary the position of said member with respect to said end, and an enlarged abutment secured to the other end of said rod above said buoyant member.

17. An adjustable float assembly for controlling the level of liquid in a washing machine, comprising a cylindrical buoyant member having a substantially centrally located longitudinal passage therethrough, an elongated rod having indicia thereon extending through said passage and projecting beyond both ends of said member, frictional means carried by and within said member disposed about said passage and engaging said rod for frictionally holding said member adjacent one end of said rod and to permit the same to be manually adjusted from one position to another therealong, and an enlarged abutment secured to the other end of said rod above said buoyant member.

THOMAS R. SMITH.

References Cited in the file of this patent

UNITED STATES PATENTS

| Number | Name | Date |
|---|---|---|
| 730,015 | Halladay | June 2, 1903 |
| 1,161,745 | Springman | Nov. 23, 1915 |
| 1,341,002 | Wright | May 25, 1920 |
| 1,351,302 | Sanna | Aug. 31, 1920 |
| 1,630,611 | Falk | May 31, 1927 |
| 2,367,196 | Butler | Jan. 16, 1945 |
| 2,401,476 | Geldhof et al. | June 4, 1946 |
| 2,449,634 | Baade | Sept. 21, 1948 |